(12) United States Patent
Cheng

(10) Patent No.: US 6,747,925 B2
(45) Date of Patent: Jun. 8, 2004

(54) METHOD AND SYSTEM FOR GENERATING A CENTER ERROR SIGNAL IN AN OPTICAL STORAGE SYSTEM

(75) Inventor: Kechen Cheng, Palo Alto, CA (US)

(73) Assignee: ProMOS Technologies Inc., Hsin-Chu (TW)

(*) Notice: Subject to any disclaimer, the term of this patent is extended or adjusted under 35 U.S.C. 154(b) by 239 days.

(21) Appl. No.: 09/996,258

(22) Filed: Nov. 28, 2001

(65) Prior Publication Data

US 2003/0099170 A1 May 29, 2003

(51) Int. Cl.[7] .................................................. G11B 7/00
(52) U.S. Cl. ................................. 369/44.35; 369/53.38
(58) Field of Search ........................... 369/44.29, 44.35, 369/44.36, 53.25, 53.28, 53.38

(56) References Cited

U.S. PATENT DOCUMENTS 4,991,162 A * 2/1991 Tabe ........................ 369/53.14
5,862,113 A * 1/1999 Tsuyuguchi et al. ..... 369/53.18
5,963,517 A * 10/1999 Nakagaki et al. ........ 369/53.14

* cited by examiner

Primary Examiner—Paul W. Huber
(74) Attorney, Agent, or Firm—Sawyer Law Group LLP

(57) ABSTRACT

A method for generating a center error signal in an optical storage system, as well as an optical storage system, is disclosed. Through the use of the method and system in accordance with the present invention, a decrease in manufacturing costs is achieved since very precise and expensive mirrors and/or photo detectors are not needed. A first embodiment of the invention includes a method for generating a center error signal in an optical storage system, the optical storage system comprising a tracking coil and an optical pick up unit, the optical pick up unit including a light beam. The method comprises the steps of sensing a voltage by a tracking coil, providing the voltage to a center error generation circuit, generating a center error signal from the center error generation circuit based on the voltage and utilizing the center error signal to center the light beam. A second embodiment of the invention includes an optical storage system. The optical storage system comprises an optical pick up unit, the optical pick up unit including a light beam, a tracking coil coupled to the optical pick up unit, the tracking coil comprising means for sensing a voltage, a center error generation circuit coupled to the tracking coil, means for providing the voltage to the center error generation circuit wherein a center error signal is generated based on the voltage; and means for utilizing the center error signal to center the light beam.

18 Claims, 4 Drawing Sheets

100

METHOD AND SYSTEM FOR GENERATING A CENTER ERROR SIGNAL IN AN OPTICAL STORAGE SYSTEM

FIELD OF THE INVENTION

The present invention relates to optical media, and more particularly to a method and system for generating a center error signal in an optical storage system.

BACKGROUND OF THE INVENTION

The demand for mass data storage continues to increase with expanding use of data processing systems and personal computers. Optical data storage systems are becoming an increasingly popular means for meeting this expanding demand. These optical data systems provide large volumes of relatively low-cost storage that may be quickly accessed.

For the optical storage system, data on an optical disk is stored in spiral or concentric tracks. A laser beam is directed through a series of optical elements and focused as a beam spot on a surface of the disk. Typically, a coarse carriage, on which is mounted an optical head with an objective lens through which the light beam passes, is moved along a radial path to enable the beam spot to be moved between the inner and the outer tracks of the disk near the inner and outer diameters of the disk. The resolution of the coarse carriage and controlling servo loop is generally sufficient only to permit the light beam to be positioned within a few tracks (such as ±5 tracks) of a desired target track. Consequently, a fine tracking actuator is employed to supplement the coarse carriage by finely controlling the light beam to position and maintain it on a single target track.

The components of a typical optical system include a housing with an insertion port through which the user inserts the recording media into the drive. This housing accommodates, among other items, the mechanical and electrical subsystems for loading, reading from, writing to, and unloading an optical disc. The operation of these mechanical and electrical subsystems is typically within the exclusive control of the data processing system to which the drive is connected.

In order to attain a precise reading of the information stored on the disc, it is necessary to be able to move the objective lens in both a focusing (i.e., perpendicular to the plane of the disc) or Z direction in order to focus the laser beam to a small point of light on a precise location of the disc to write or retrieve information, and in a tracking (i.e., radial from the center of the disc) or Y direction to position the beam over the exact center of the desired information track on the disc. Focus and tracking corrections may be effected by moving the objective lens in either the direction of the optical axis of the lens for focusing, or in a direction perpendicular to the optical axis for tracking.

Optical recording and playback systems, such as those utilizing optical memory disks, compact disks, or video disks, require precise focusing of an illuminating optical beam through an objective lens onto the surface of an optical disc. The incident illuminating beam is generally reflected back through the objective lens, and is then used to read information stored on the disc. Subsequent to passing back through the objective lens, a portion of the reflected beam is typically directed to an apparatus designed to gauge the focus of the illuminating beam on the disc. Information extracted from the reflected beam by this apparatus may then be used to adjust the focus of the illuminating beam by altering the position of a movable objective lens relative to the disc.

In order to move the light beam rapidly and accurately to the target track locations on the medium of optical drives, normally two stages of seeking operations are applied for the optical drive systems like CD, DVD and MO drives. Conventional tracking search systems typically have two different modes of tracking access. A "fine access" tracking mode for seeks from 1 to a predefined number of tracks and a "coarse access" tracking mode for seeks greater than the predefined numbers mentioned in the fine search.

The fine access tracking mode is typically a closed loop speed controlling lens kick done by moving the light beams from the starting track to target track.

The coarse access tracking mode is typically an open loop control method that directly drives the coarse carriage that is coupled to a sledge motor with a preset amount of driving force and direction. Some systems use a center position servo to control the lens near the center of the stroke during the rough search. In this type of servo, an analog center error (CE) signal is used. Most conventional optical storage systems typically use one of two schemes to generate a CE signal: the Galvanometer mirror scheme or the Lens Position Sensor scheme.

Unfortunately, each of these schemes involve very precise mirrors or photo detectors, as well as accurately aligned emitters and reflective devices. For example, the Galvanometer Mirror scheme typically requires a light source for emitting a light beam, a galvanometer mirror for deflecting the light beam, an objective lens for converging the light beam on the storage medium and a condensing lens that is situated between the galvanometer mirror and the objective lens for permitting the reflective surface of the galvanometer mirror and the front focal point of the objective lens to be located at substantially conjugate positions that are substantially conjugate with each other.

Additionally, the Lens Position Sensor Scheme typically requires a tracking mirror, a position sensor mechanism that is disposed near the tracking mirror to detect a rotary position of the tracking mirror and a carriage control mechanism that is disposed near the tracking mirror to control the movement of the carriage based on an output signal from the position sensor mechanism so as to correct an incident angle of the light beam incident to an objective lens.

A light source is disposed in the position sensor mechanism and fixed to a rear face side of the tracking mirror with respect to a reflecting face thereof such that the light source is rotated integrally with the tracking mirror. A light-receiving element is also disposed in the position sensor mechanism to output a signal indicative of a rotary angle of the tracking mirror to the carriage control mechanism by receiving light emitted from the light source.

The above-referenced center error generation schemes require very precise and expensive mirrors and/or photo detectors as well as accurately aligned emitters and reflective devices. Accordingly, there exists a need for an improved method and system for generating a center error signal in an optical storage system. The improved method and system should be cost effective and capable of being easily adapted to existing technology. The present invention addresses such a need.

SUMMARY OF THE INVENTION

A method and system for generating a center error signal in an optical storage system is disclosed. Through the use of the method and system in accordance with the present invention, a decrease in manufacturing costs is achieved since very precise and expensive mirrors and/or photo detectors are not needed.

A first embodiment of the invention includes a method for generating a center error signal in an optical storage system, the optical storage system comprising a tracking coil and an optical pick up unit, the optical pick up unit including a light beam. The method comprises the steps of sensing a voltage by the tracking coil, providing the voltage to a center error generation circuit, generating for a center error signal from the center error generation circuit based on the voltage, and utilizing the center error signal to center the light beam.

A second embodiment of the invention includes an optical storage system. The optical storage system comprises an optical pick up unit, the optical pick up unit including a light beam, a tracking coil coupled to the optical pick up unit, the tracking coil comprising means for sensing a voltage, a center error generation circuit coupled to the tracking coil, means for providing the voltage to the center error generation circuit wherein a center error signal is generated based on the voltage, and means for utilizing the center error signal to center the light beam.

A third embodiment of the present invention comprises a system for generating a center error signal in an optical storage system, the optical storage system comprising a tracking coil and an optical pick up unit, the optical pick up unit including a light beam. The system comprises means for sensing a voltage with the tracking coil, means for providing the voltage to a center error generation circuit, means for generating a center error signal from the center error generation circuit based on the voltage, and means for utilizing the center error signal to center the light beam.

Other aspects and advantages of the present invention will become apparent from the following detailed description, taken in conjunction with the accompanying drawings, illustrating by way of example the principles of the invention.

DETAILED DESCRIPTION

The present invention provides a method and system for generating a center error signal in an optical storage system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A method and system for generating a center error signal in an optical storage system is disclosed in the context of a preferred embodiment. Through the use of the method and system in accordance with the present invention, a decrease in manufacturing costs is achieved since very precise and expensive mirrors and/or photo detectors are not needed.

Figure 1:
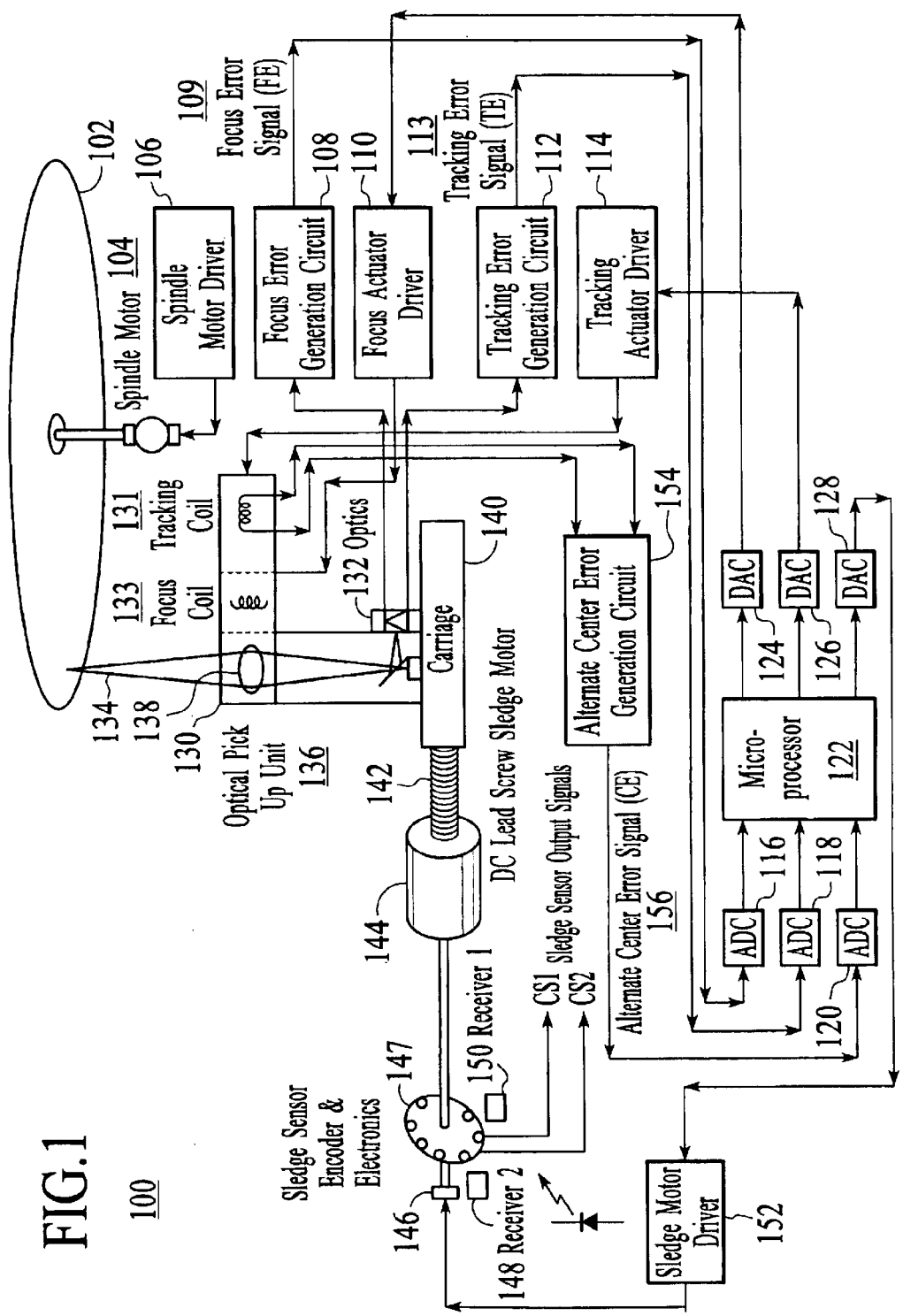
FIG. 1 is a diagram illustrating an optical storage system in accordance with the present invention.

To more particularly describe the features of the present invention, please refer to FIG. 1. FIG. 1 is a diagram illustrating an optical storage system 100 in accordance with the present invention. The system 100 comprises a compact disk ("CD") 102, a spindle motor 104, a spindle motor driver 106, a focus error generation circuit 108, a focus actuator driver 110, a tracking error generation circuit 112, and a tracking actuator driver 114. The system 100 further comprises multiple analog to digital converters ("ADCs") 116, 118, 120, a microprocessor 122, multiple digital to analog converters ("DACs") 124, 126, 128, an optical pick-up unit ("OPU") 136, a coarse carriage 140, a lead screw 142, a sledge motor 144, a sledge sensor encoder and related electronics ("sledge sensor") 146, an encoder disk 147, two receivers 148, 150, a sledge motor driver 152, and a center error generation circuit 154.

The OPU 136 comprises an objective lens 138, a tracking actuator 130 which includes a tracking coil 131 and a focus actuator 132 which includes a focus coil 133. The OPU 136 is sitting on the coarse carriage 140 and a DC lead screw type sledge motor 144 drives the coarse carriage 140. A CD 102 is played from the underside with a light beam 134. The light beam 134 is focused up onto the bottom of the CD 102 through the objective lens 138 located below the CD 102. The tracking and focus actuators 130, 132, with their mobile parts totally suspended on elastic elements, are dedicated to keep the light beam 134 in focus and on the spiral track. The focus actuator 132 will perform the focus adjustment and the tracking actuator 130 will perform the track adjustment.

The spindle motor 104 is coupled to the spindle motor driver 106 whereby the spindle motor driver 106 controls the spindle motor speed. The focus error generation circuit 108 is coupled to the OPU 136 and sends a focus error signal 109 to the microprocessor 122 via ADC 116. The microprocessor 122 measures the focus error signal 109 and sends a signal to the focus actuator driver 110 via DAC 124 wherein the focus actuator driver 110 controls the adjustment of the focus actuator 133 based on the signal.

The tracking error generation circuit 112 is coupled to the OPU 136 and sends a tracking error signal 113 to the microprocessor via ADC 118. The microprocessor 122 measures the tracking error signal 113 and sends a signal to the tracking actuator driver 114 via DAC 126 wherein the tracking actuator driver controls the adjustment of the tracking actuator 130 based on the signal.

As the CD 102 is played from beginning to end, the objective lens 138 is driven by a lead screw sledge system across the disk 102. The lead screw sledge system comprises a sledge motor 144 turning a lead screw 142 that moves a coarse carriage 140. The sledge sensor 146 is coupled to the motor 144 and is utilized to sense the rough location of the light beam 134 along the disk surface. The sledge sensor 146 has a laser diode on one side of the encoder disk 147 to transmit the light, and light receivers 148, 150 on another side to sense the light through the holes of the encoder disk 147.

As the CD 102 is spinning, the light beam 134 follows the spiral track of the CD 102 from the inner radius to the outer radius during the normal play mode. The tracking actuator 130 has limited movement and it relies on the sledge motor 144 to move the coarse carriage 140 and keep the light beam 134 centered during the entire play mode. However, during the play mode, if the light beam 134 becomes off-centered, a center error signal will cause the sledge motor 144 to move the carriage 140 and re-center the light beam 134.

Optical sensors (not shown) located within the OPU 136, locate and determine the position of the light beam 134.

When the light beam 134 is not at its track center, electrical circuitry (not shown) within the OPU 136 will generate a voltage through the tracking coil 132 based on how far the light beam 134 is off-centered. This is known as the tracking error. Accordingly, when the light beam 134 is at its track center, there is no voltage through the tracking coil 132 and the tracking error is zero. In accordance with the present invention, any measured tracking error (voltage across the tracking coil 132) is utilized to generate a center error signal 156. This center error signal 156 is received by the sledge motor driver 156 via the microprocessor 122 which causes the sledge motor 144 to move the carriage 140 to re-center the light beam 134.

Figure 2:
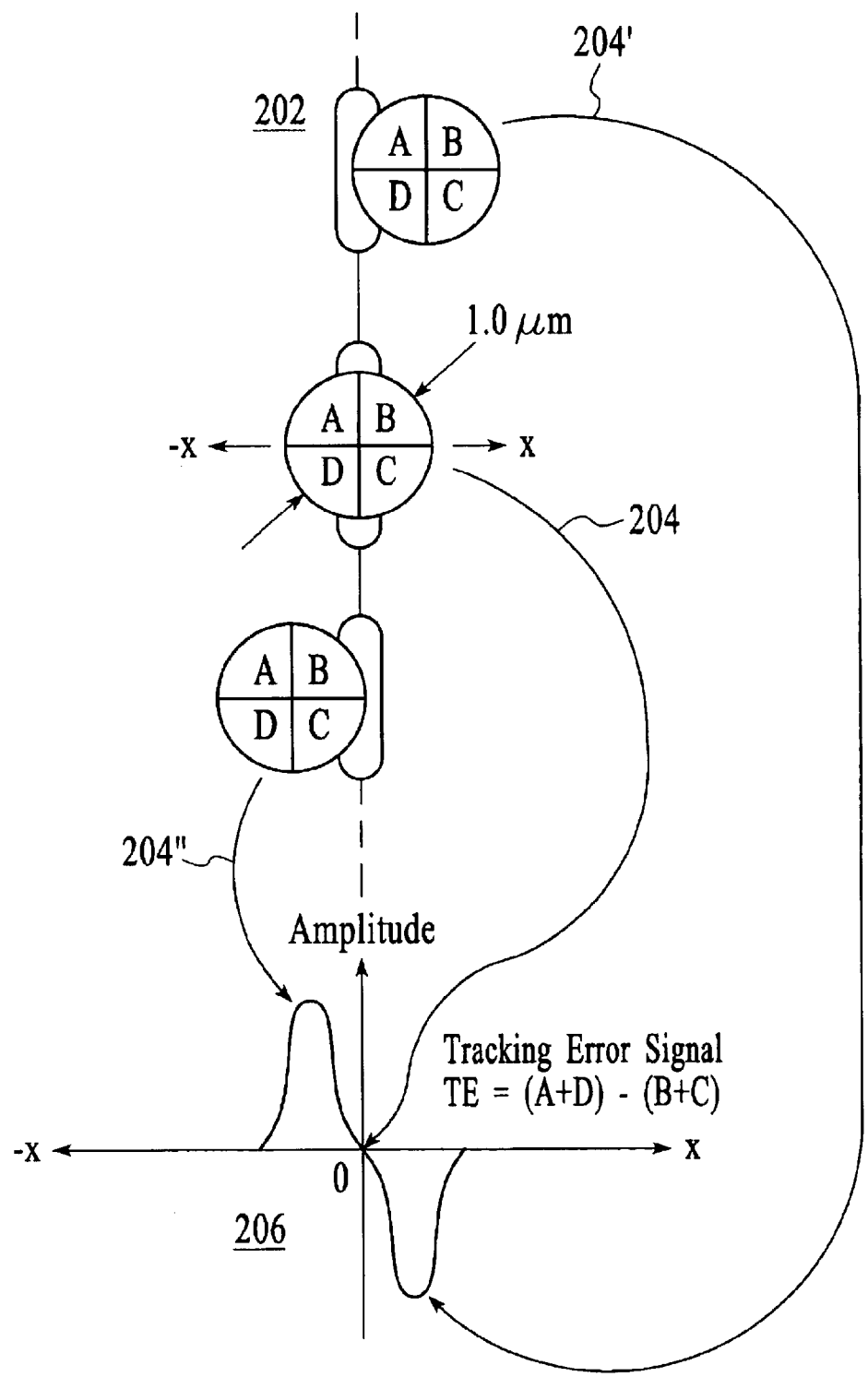
FIG. 2 shows a CD track wherein the light beam is centered over the track.

To further understand this concept, please refer to FIG. 2. FIG. 2 shows a CD track 202 wherein the light beam 134 (from FIG. 1) is centered over the track 202. Four optical sensors (A, B, C, D) located within the OPU are respectively represented by circular regions 204, 204', 204". Also shown in FIG. 2 is a graph 206 that shows the amplitude of the tracking error i.e. the voltage that will be generated across the tracking coil 131 based on the location of the circular regions 204, 204', 204". The tracking error is measured utilizing the equation:

$$TE=(A+D)-(B+C)$$

where TE is the measured tracking error and A, B, C and D represent values based on the respective locations of the sensors A, B, C and D.

Circular regions 204, 204' 204" represent three different locations of the optical sensors (A, B, C, D). Circular region 204 represents the location of the optical sensors when the light beam 134 is maintained perfectly at the center of the track 202. Accordingly, as shown on the graph 206, the amplitude of the tracking error (and thus the voltage across the tracking coil) is 0 at this point. However, during CD operation, the light beam 134 may become off-centered. Consequently, circular region 204' represents the location of the optical sensors when the light beam 134 is off-centered to the right and circular region 204" represents the location of the optical sensors when the light beam 134 is off-centered to the left. Based on this, the corresponding amplitude of the tracking error (and thus the voltage across the tracking coil) based on the respective locations of the light beam 134 is shown on the graph 206.

The method of generating the center error signal in accordance with the present invention, is easy to implement and low in cost since there are no expensive photo detection sensors or mirrors. Referring back to FIG. 1, in accordance with the present invention, any voltage generated across the tracking coil 131 is taken as the center position error and is utilized to generate the center error signal 156. This accomplished by taking the voltage through the center error generation circuit 154 where it goes through a differential amplifier for amplification and a low pass filter to remove high frequency noise signals. The output signal of this center error generation circuit 154 is then utilized as the center error signal 156 and represents the error that needs to be accounted for in order to re-center the light beam 134. This center error signal 156 is subsequently sent through ADC 120 and on to the microprocessor 122. The microprocessor 122 measures the center error signal 156 and sends the measured signal through DAC 128 wherein the signal is then sent to the sledge motor driver 152. The sledge motor driver 152 then causes the carriage 140 to re-center the light beam 134 based on the measured center error signal 156.

Figure 3:
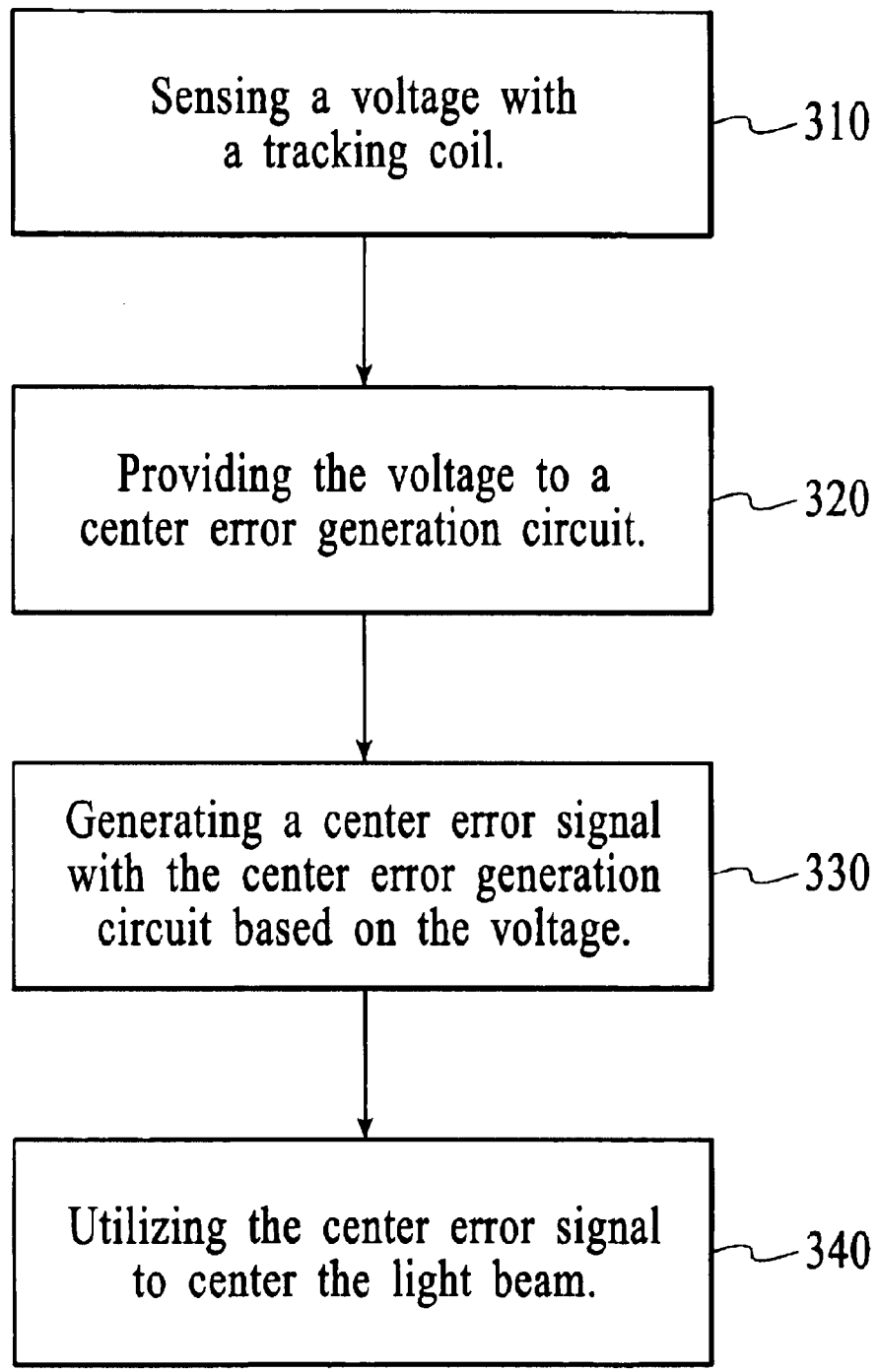
FIG. 3 is a flowchart of the method in accordance with the present invention.

For a more detailed description, please refer now to FIG. 3. FIG. 3 is a flowchart of the method in accordance with the present invention. First, a tracking coil senses a voltage, via step 310. This voltage is based on the light beam being off-centered. Next, the voltage is provided to a center error generation circuit, via step 320. Preferably, the center error generation circuit comprises a voltage differential amplifier and a low pass filter and the voltage is taken through the differential amplifier for amplification and the low pass filter to remove high frequency noise signals. Next, the center error generation circuit generates an output signal or center error signal based upon the voltage, via step 330. Finally, the center error signal is utilized to center the light beam, via step 340. Here, the sledge motor driver receives the center error signal from the microprocessor and moves the carriage to center the light beam based on the center error signal. As a result, the center error signal can be generated without the use of very precise and expensive mirrors and/or photo detectors. This results in a substantial reduction in manufacturing costs.

Tracking Offset Calibration

In tracking servo systems, the imperfections and tolerances of the electronic components and mechanical parts, may introduce some offset into the tracking actuator. Accordingly, the system in accordance with the present invention can accomplish tracking offset calibration very easily. Please refer back to FIG. 1. As previously mentioned, when there is no voltage through the tracking coil 131, the center error signal 156 has a corresponding value of zero. The microprocessor 122 accordingly sets this value as the calibration reference point for the tracking actuator 130.

Accordingly, when the tracking actuator 130 needs to be calibrated, the microprocessor 122 reads the center error signal 156 from the center error generation circuit 154. If the tracking actuator 130 is not calibrated, the center error signal 156 will not be at the calibration reference point. The microprocessor 122 will then determine an offset adjustment value based on the center error signal 156. This value will be based on the size of the center error signal 156 i.e. how much the tracking actuator 130 is misaligned. The microprocessor 122 then sends a signal to the tracking actuator driver 114 based on the offset adjustment value to re-align (calibrate) the tracking actuator 130. This offset adjustment value is then stored in a register within the microprocessor 122, for future reference, as the calibration offset adjustment value.

Figure 4:
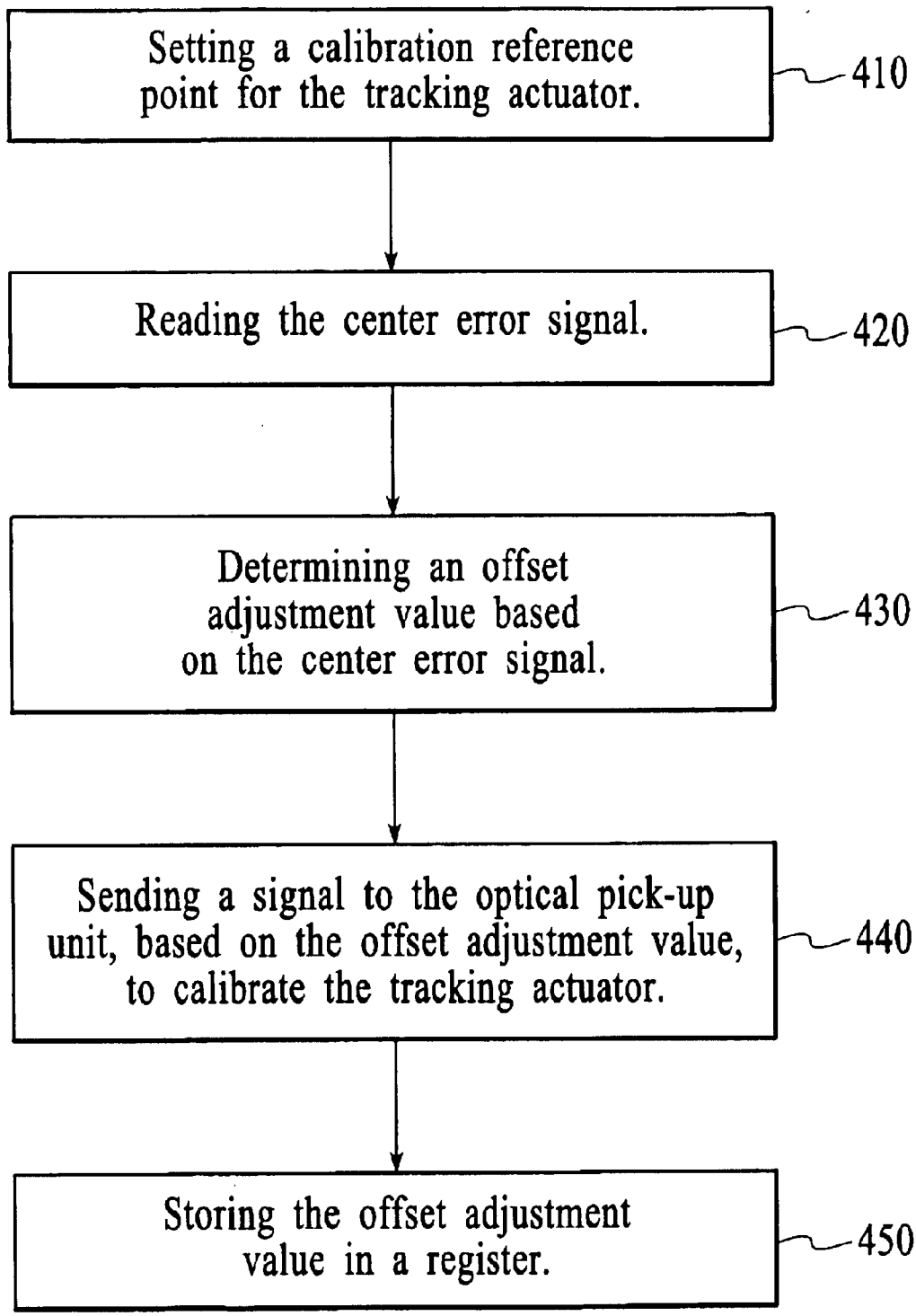
FIG. 4 is a flowchart of how the system in accordance with the present invention accomplishes tracking offset calibration.

For a better understanding of how the system in accordance with the present invention accomplishes tracking offset calibration, please refer to FIG. 4. FIG. 4 is a flowchart of how the system in accordance with the present invention accomplishes tracking offset calibration. In a preferred embodiment, the microprocessor performs this tracking offset calibration. One of ordinary skill in the art recognizes a plurality of the devices could be utilized and they would be within the spirit and scope of the present invention. First, a calibration reference point for the tracking actuator is set, via step 410. Preferably, the calibration reference point is the point at which the center error signal has a value of zero. Next, during calibration, the center error signal is read, via step 420. Then an offset adjustment value based on the center error signal is determined, via step 430. Thereafter, a signal is sent to the optical pick up unit, based on the offset adjustment value, to re-align (calibrate) the tracking actuator, via step 440. Finally, the offset adjustment value is stored in a register, for future reference, as the tracking offset adjustment value, via 450.

A method and system for generating a center error signal in an optical storage system is disclosed. Through the use of the method and system in accordance with the present invention, a decrease in manufacturing costs is achieved since very precise and expensive mirrors and/or photo detectors are not needed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of appended claims.

What is claimed is:

1. A method for generating a center error signal in an optical storage system, the optical storage system comprising a tracking coil and an optical pick up unit, the optical pick up unit providing a light beam, the method comprising the steps of:

a) sensing a voltage by the tracking coil;
   b) providing the voltage to a center error generation circuit;
   c) generating a center error signal from the center error generation circuit based on the voltage, and
   d) utilizing the center error signal to center the light beam.

2. The method of claim 1 wherein the center error generation circuit comprises a differential amplifier and a low pass filter wherein the voltage goes through the differential amplifier for amplification and the low pass filter to remove high frequency noise signals.

3. The method of claim 2 wherein step d) further comprises:

d1) measuring the center error signal; and
   d2) signaling the optical pick up unit to center the light beam based on the measuring step (d1).

4. The method of claim 1 wherein the center error signal is utilized in a calibration process for the optical storage system.

5. The method of claim 4 wherein the calibration process comprises:

1) setting a calibration reference point for the tracking actuator;
   2) reading the center error signal;
   3) determining an offset adjustment value based on the center error signal; and
   4) sending a signal to the optical pick up unit, based on the offset adjustment value, to calibrate a tracking actuator within the optical storage system.

6. The method of claim 5 wherein the calibration process further comprises:

5) storing the offset adjustment value in a register.

7. An optical storage system comprising:

an optical pick-up unit, the optical pick-up unit providing a light beam;
   a tracking coil coupled to the optical pick up unit, the tracking coil comprising means for sensing a voltage;
   a center error generation circuit coupled to the tracking coil;
   the center error generator circuit for receiving the voltage and for generating center error signal based upon the voltage; and
   a driver for receiving the center signal and for utilizing the center error signal to center the light beam.

8. The optical storage system of claim 7 wherein the center error generation circuit comprises a voltage amplifier and a low pass filter wherein the voltage goes through the differential amplifier for amplification and the low pass filter to remove high frequency noise signals.

9. The optical storage system of claim 8 further comprises:

means for measuring the center error signal; and
   means for signaling the optical pick up unit to center the light beam.

10. The optical storage system of claim 7 further comprising means for utilizing the center error signal in a calibration process for the optical storage system.

11. The optical storage system of claim 10 which further includes a tracking actuator, and the system further comprises:

means for setting a calibration reference point for the tracking actuator within;
   means for reading the center error signal;
   means for determining an offset adjustment value based on the center error signal; and
   means for sending a signal to the optical pick up unit, based on the offset adjustment value, to calibrate the tracking actuator.

12. The optical storage system of claim 11 further comprising:

a register for storing the offset adjustment value.

13. A system for generating a center error signal in an optical storage unit, the optical storage system, the optical storage system comprising a tracking coil and an optical pick up unit, the optical pick up unit providing a light beam, the system comprising:

means for sensing a voltage with the tracking coil;
   means for providing the voltage to a center error generation circuit;
   means for generating a center error signal from the center error generation circuit based on the voltage; and
   means for utilizing the center error signal to center the light beam.

14. The system of claim 13 wherein the center error generation circuit comprises a differential amplifier and a low pass filter wherein the voltage goes through the differential amplifier for amplification and the low pass filter to remove high frequency noise signals.

15. The system of claim 13 wherein the means for utilizing the center error signal to center the light beam further comprises:

means for measuring the center error signal; and
   means for signaling the optical pick up unit to center the light beam.

16. The system of claim 13 further comprising means for utilizing the center error signal in a calibration process for the optical storage system.

17. The system of claim 16 wherein the optical unit includes a tracking actuator, the system further comprising:

means for setting a calibration reference point for the tracking actuator;
   means for reading the center error signal;
   means for determining an offset adjustment value based on the center error signal; and
   means for sending a signal to the optical pick up unit, based on the offset adjustment value, to calibrate the tracking actuator.

18. The system of claim 17 further comprising:

a register for storing the offset adjustment value.

* * * * *